United States Patent [19]

Tyler et al.

[11] 3,839,140
[45] Oct. 1, 1974

[54] FLAME RETARDANT YARNS

[75] Inventors: Geoffrey James Tyler; Ali Akbar Mohajer, both of Pontypool; Frederick Anthony Bell, Harrogate, all of England

[73] Assignee: Imperial Chemical Industries Limited, London, England

[22] Filed: Feb. 2, 1972

[21] Appl. No.: 222,993

[52] U.S. Cl.............. 161/175, 161/176, 161/403, 260/2.5 FP, 260/75 H, 260/DIG. 24, 264/171
[51] Int. Cl.. D02g 3/02, D06m 13/00, D06m 13/08
[58] Field of Search.................... 161/175, 176, 403; 260/75 H, 2.5 FP, DIG. 24; 264/171

[56] References Cited
UNITED STATES PATENTS

| | | | |
|---|---|---|---|
| 3,640,964 | 2/1972 | Stewart | 260/75 H |
| 3,642,944 | 2/1972 | Abbott, Jr. | 260/DIG. 24 |
| 3,658,634 | 4/1972 | Yanagi | 161/175 |
| 3,700,957 | 10/1972 | Daniels | 260/75 H |

FOREIGN PATENTS OR APPLICATIONS 1,243,145  8/1971  Great Britain

*Primary Examiner*—Harold Ansher
*Assistant Examiner*—Ellis P. Robinson
*Attorney, Agent, or Firm*—Andrew F. Sayko, Jr.

[57] ABSTRACT

Flame-retardant filaments are obtained using additives which normally give rise to discolouration or problems during melt spinning by encapsulating the additive in the form of a core in a sheath/core filament, the sheath of which may be a polyamide or polyester. The additive is preferably dispersed or combined with a matrix comprising polyamide or polyester and is preferably a bromine containing compound such as deca bromodiphenyl or polyhexamethylene 2,5, dibromo terephthalate. The efficiency of the flame-retardancy may be improved by the addition of up to 5 percent by weight of a metal oxide such as antimony trioxide, the weight percentage being based on the metal content of the oxide.

8 Claims, No Drawings

FLAME RETARDANT YARNS

The present invention relates to flame-retardant conjugate fibres or filaments.

Numerous proposals have been put forward for the conferring of flame-retardance on melt extruded filaments or fibres for use, for example, in the textile industry. In very many cases, however, the resulting filaments, containing suitable adjuvants conferring flame-retardance, have undesirable surface properties.

By this we mean that the aforesaid adjuvants may lead to undesirably discoloured surface appearance, sensitivity of the surface to heat and light etc., or to surfaces which give trouble when said filaments are processed such as by passing them over guides, drawing them or thermally treating them.

Furthermore, said resulting filaments, if they are to be drawn, may be difficult to draw and process due to changes in the polymer characteristics brought about by the said adjuvants.

Such adjuvants are hereinafter referred to as "reactive adjuvants," that is they react with the polymers or polymer precursors during polymerisation, spinning or subsequent fibre processing to produce the above referred to undesirable effects.

Applicants have now found that many of the aforesaid difficulties can be overcome, whilst preserving the flameretardance of the fibre or filament, if said fibre or filament consists of a flame-retardant core, containing a reactive adjuvant, surrounded by a polymer sheath which has good surface properties and which is easily processable, such as a sheath of polyester or polyamide.

In the term "polyester" we include copolyesters and in the term "polyamide" we include copolyamides.

The present invention therefore provides a flame-retardant conjugate filament consisting of two components in sheath/core relationship, the sheath comprising a melt extrudable fibre-forming polymer surrounding a flame-retardant melt extrudable core containing a reactive adjuvant.

More particularly the present invention consisting of two components in sheath/core relationship, the sheath comprising a fibre-forming polyester or a fibre-forming polyamide and the core comprising a fibre-forming flame-retardant polyamide or polyester.

Surprisingly, it has been found that although the core portion only of the filament contains a flame-retardant reactive additive the sheath/core filament, as a whole, is self-extinguishing.

One way of producing a flame-retardant core is to add to said core, and in particular to a polyamide core, halogen containing compounds.

Hence, even more particularly, the present invention provides a flame-retardant conjugate filament consisting of two components in sheath/core relationship, the sheath comprising a fibre-forming polyester or a fibre-forming polyamide and the core comprising either a fibre-forming polyamide or polyester containing halogen groups and preferably bromo groups or of a fibre-forming polyamide or polyester mixture of which at least one constituent contains halogen groups and preferably bromo groups.

Whilst the use of halogen containing compounds for conferring flame-retardance to the core, and particularly halogen compounds of the class hereinafter defined, are preferred, of course, other suitable agents conferring flame-retardance on the core may be employed, for instance, suitable phosphorus compounds.

Examples of preferred halogen containing compounds for use in practising the present invention where a polyamide is the substrate are defined as follows:

i. The molecule of the compound comprises one or more benzene rings or one or more condensed benzene ring structures or a combination of said rings and ring structures. Neighbouring benzene rings may be joined by one or two links. If there is one link it may be a direct linkage or a linkage via groups which are stable in the polyamide melt such as $-(CR_2)_n-$, $-O-$, $-SO_2-$, $-O-(CR_2)_m-O-$, where R is H or alkyl and $n$ is 1 or more and preferably 2-6 and $m$ is 2 or more and preferably 3-6, or,

where R' is alkyl, aryl or $(CH_2)p0$, where $p>1$ and 0 indicates a benzene ring and where any aromatic ring may carry halogen substituents. If there are two links at least one linkage must be via one of the aforesaid groups.

ii. At least one benzene ring or condensed ring structure is substituted by at least one halogen grouping.

iii. No halogen shall be in the ortho position to any other halogen nor to any polymer-reactive or to any electron accepting group.

iv. The molecule may be substituted by polymerreactive groups, such as amide-forming groups or polymerisable derivatives thereof and preferably separated from any benzene ring or condensed ring structure by an alkylene group.

Any ring or condensed ring structure may be further substituted, preferably symmetrically, by non-reactive, non-polar groups such as methyl groups.

In the above definition, by the term "condensed ring structure" we mean, for instance, a naphthalene or anthracene type of structure. Symmetrical substitution on the molecule is preferred since such structures have been found to give the minimum interferences with the physical properties of the basic polymer and of the yarn produced from it.

The preferred halogen is bromine since this element is more active than chlorine in conferring flame-resistance.

Examples of suitable compounds are:
3,6-dibromodurene
bis(p-bromophenyl) ether
4-bromodiphenyl
2,7-dibromo-9,9-bis (β-carboxyethyl) fluorene
2,4,6,2',4',6', hexabromodiphenyl Examples of preferred halogen containing compounds for use in practising the present invention where a polyester is the substrate include polymers derived from a brominated dicarboxylic acid and/or a brominated glycol, for example, poly(hexamethylene-2:5 dibromo terephthalate) or poly(ethylene-2:7 dibromofluorene-9:9 dipropionate). Other suitable bromo organic compounds include tetrabromo benzene, penta-bromo toluene, acetylated tetrabromobisphenol A, deca bromo diphenyl and bis (4-bromophenyl) ether.

An enhanced flame-retardant effect can be obtained when, in addition to the proportion of halogen compound present in the core of the filament, there is present a proportion of a synergistic metal compound in the sheath or in the core, or in both. The useful metal compounds are metal oxides, such as antimony trioxide or titanium dioxide. The proportion, or proportions, of such compounds should preferably be such that the overall content corresponds to from 0.5 to 5 percent by weight expressed as metal on the total of core and sheath. The metal compound should preferably be of low volatility under the conditions of processing the polymer to a filament.

When using a halogen compound, the synergistic metal compound, if present, may be incorporated at any stage in the preparation of the filament, for example, during the preparation of the polymer, by mixing into the formed polymer or by mixing into the melt at the stage of melt spinning.

The core portion may also consist of an intrinsically flame-retardant material.

The conjugate filaments of our invention may be made from the two component parts by any of the conventional methods of forming sheath/core filaments by melt spinning.

An advantage of the conjugate filaments of our invention is that they possess an advantageous degree of fire retardancy without there being any substantial danger of disadvantageous effects produced by the presence of harmful compounds at the filament surface, e.g. discolouration and cross-linking. Furthermore, in the said filaments, particularly when using the above defined halogen compounds, there is a much reduced tendency for the incorporated compound, when not forming part of the polymer chain to be volatilised from the surface of the filament during manufacture and processing, since the concentration of adjuvant at the surface is nil. Additionally excessive delustring resulting from the necessity to incorporate high loadings of antimony trioxide, for example, is alleviated by using an undelustred sheath.

As regards the relative proportions of sheath and core, this depends on the relative importance of the various advantageous factors. Thus, the thicker the sheath, the less likelihood is there of volatilisation of the adjuvant and the less noticeable is any discolouring which may occur in the core polymer. On the other hand, the thicker the sheath, the less is the proportion of core, and therefore the higher is the required proportion of flame-retarding adjuvant in the core. A preferred limit may be set for the content of adjuvant in the core at about 20 percent by weight, beyond which difficulty is experienced in processing. This allows the use of a very small minimum value for the percentage of the cross-sectional area of the filament occupied by the core, for example 5–10 percent. A practicable minimum for the thickness of the sheath is that for which the percentage of the cross-sectional area of the filament occupied by the sheath is 5–10 percent.

Polyesters for use in the process of our invention may, for example, be based on terephthalic acid, naphthalene 2:6-dicarboxylic acid and 1:2-diphenoxyethane-pp'-dicarboxylic acid. Glycols on which the polyester may be based include $HO(CH_2)_nOH$, wherein n is not less than 2 and not greater than 10, and bis (hydroxymethyl) cyclohexane. Copolyesters may have as second acid a dicarboxylic acid, for example, isophthalic, adipic, sebacic or sulphoisophthalic acids, or a hydroxycarboxylic acid, for example, para hydroxybenzoic acid. Copolyesters for use in the process of our invention may also be based on two glycols; a second glycol may be a polyglycol.

Polyamides and copolyamides for use in this invention may be prepared by the polymerisation of diamines and dibasic acids or polyamide-forming functional derivatives of these acids. As examples of suitable diamines may be listed linear polymethylene aliphatic diamines of general formula $H_2N(CH_2)_nNH_2$, where n is not less than 4 and not greater than 20, branched chain aliphatic diamines, for example 2,2,4-trimethyl hexamethylene diamine; ether diamines, for example, 3,3'-bis(aminopropyl) ether, ethylene bis(3-aminopropyl) ether; cycloaliphatic diamines, for example, 1,4-bis (aminomethyl) cyclohexane, bis(4-aminocyclohexyl) methane; aryl aliphatic diamines, for example, m-xylylene diamine, p-xylylene diamine; and heterocyclic diamines, for example, piperazine.

The above diamines may be condensed singly or in various combinations as appropriate and familiar to those skilled in the art with functional derivatives of oxalic acid; with linear polymethylene dicarboxylic acids (or their polyamide-forming function derivatives) of general formula $HOOC(CH_2)_mCOOH$, where m is not less than 4 and not greater than 20; with branched-chain aliphatic dicarboxylic acids, for example, 2-methyl butane, 1,4-dicarboxylic acid, with cycloaliphatic dicarboxylic acids, for example cyclohexane 1,4-dicarboxylic acid; with aromatic dicarboxylic acids, for example, terephthalic acid, isophthalic acid, 2,5-dimethyl terephthalic acid, naphthalene 1,4-dicarboxylic acid, benzophenone 2,4'-dicarboxylic acid; with arylaliphatic dicarboxylic acids, for example, 2,5-dimethyl p-phenylene diacetic acid, 2,2-bis [p-carboxy-methoxy phenyl] propane, bis [p-carboxymethyl phenyl] ether; with heterocyclic dicarboxylic acids, for example, furan 2,5-di (β-propionic acid).

Mixtures of these acids may be used to prepare copolyamides.

Polyamides and copolyamides may also be prepared from ω-amino- acids or the derived cyclic lactams, used either alone or in combination with the above diacids and diamines in appropriate stoichiometric balance. For example, ε-aminocaproic acid, caprolactam, ω-aminoundecanoic acid, ω-aminododecanoic acid, 7-heptanolactam, 8-octanolactam.

Other additives commonly present in polyester and/ or polyamides or other materials used for sheath and core may also be present in the proportion in which they are commonly used. Examples, of such additives are delustrants, stabilisers, pigments and optical whiteners, dye assistants and antistatic agents.

In order that the nature of our invention may be more easily understood, we give hereinafter some nonlimitative examples of methods by which it may be put into practice. In these examples all parts and percentages are by weight.

Flame-retardance, as used in Examples 1 to 19, is measured in the following manner.

The fibre or filament is knitted into hoseleg panels (16 × 4 inches) and the panels scoured to free them from spinning finish. The panels are tested for flammability as follows:

The apparatus consists of a metal frame 16 × 3½inches wide, inclined at 45°. The sample stocking panel when flat measures 16 × 4 inches. A strip of glass fibre non-woven fabric is cut to 16 × 5 inches. To form the test specimens the sample stocking panel is mounted centrally on the glass fibre fabric. A line of staples is run vertically up the centre of the composite panel, ends barely touching, and the two parallel long edges are stapled at 4 inches intervals. The positioning of the staples is important as they act as heat conductors.

The specimen is mounted on the metal frame with the bottom edge even with the bottom of the frame and held there by means of stentor pins protruding from the upper surface of the frame. The holder is placed in a draughtfree cabinet, the sliding door of which is closed to within 4 inches of the bottom of the cabinet. A flame is applied to a fuse attached to the centre of the bottom edge of the specimen. The fuse is made up of a piece of tissue paper measuring 4 × 3 inches, folded 6-fold to give a fuse measuring 1 × 1½inches. The fuse is fixed to the glass fibre so that three-fourths inch of it overlaps the specimen. The fuse is lit by a match and by itself burns for 54 seconds.

The fibres or filaments, or fabrics prepared therefrom, should preferably show the following results when tested in the above manner.

Maximum Mean Burning Time (seconds) not greater than 50 seconds.

Maximum Mean Char Length (inches) not greater than 10 inches.

Flame-retardance for Examples 20–24 was measured as follows:

Materials and Apparatus 1. 100 percent Glass Fibre woven fabric (Turner Brothers Asbestos Company Limited "Duraglas" Quality EKW211).
2. 67 percent Terylene/33 percent cotton 4 oz. woven fabric.
3. Stapler using 1 cm staples.
4. A cabinet.
5. A sample holder.

Procedure

1. Cut a piece of glass fabric 10 × ½ inches (Turner Brothers Asbestos Company Limited "Duraglas" Quality EKW211).
2. Remove every third strand of the horizontal weave (shortest length).
3. Ply up the fibre to be tested to approximately 150 denier.
4. Knit up the fibre as hose-leg on the Chell knitting machine using medium tension.
5. Cut 20 inches samples of the hose-leg.
6. Lay the glass fabric on one half of the sample, fold over the sample so that the glass fibre is sandwiched between two layers of fabric.
7. Staple the sample to the glass fabric with the fold at the bottom.
8. Cut a piece of the Terylene/cotton fabric 3 × 1 inches.
9. Fold the Terylene/cotton fabric in two so that it measures 1½× 1 inches, and staple this to the bottom edge of the sample, so that the fold is at the bottom, and the material is attached to either side of the sample.
10. Mount the sample on the frame with the wick at the bottom and so that it is held firmly, frr from wrinkles.
11. Place the frame vertically in the cabinet situated in a fume cupboard, with the fans on.
12. Expose the bottom edge of the wick to the flame of a match for 2 seconds.
13. Start the stop-watch and close the front of the cabinet.
14. Note the total time taken for the flame to extinguish and the type of flame.
15. Measure the char melt length. This is the distance between the bottom of the sample and the highest point where the fabric has been damaged by the flame. Where possible six samples of each variant should be tested for consistency of results.

EXAMPLE 1

74.67 parts of 6.6/6 copolyamide (90/10 w/w) were melt blended with 25.33 parts of hydrated hexamethylene diammonium salt of 2,7-dibromo-9,9-bis($\beta$-carboxyethyl) fluorene (Br content 26.0 percent) for 30 minutes at 285°C in an atmosphere of nitrogen. The resulting polymer had the following characteristics:

| | |
|---|---|
| Relative viscosity | 26.3 |
| Amine end groups | 24.2 equiv./$10^6$g |
| Carboxyl end groups | 70.5 equiv./$10^6$g |
| Bromine content | 7.0% |

A sheath/core yarn was produced with 50 percent of the above bromine-containing copolyamide in the core and 50 percent of 6.6 polyamide containing 4 percent antimony trioxide in the sheath. The 5-filament yarn was drawn (DR = 4.0) at 75°C to give a yarn of 44 dtex with the following properties:

| | |
|---|---|
| Tenacity | 2.74 g/dtex |
| Extensibility | 44.6% |

The yarn was knitted into hoseleg panels (16 × 4 inches) and the panels scoured to free from spinning finish. The panels were tested for flammability as hereinbefore described. The results obtained from the tests are given in Table 1 (see Example 5).

EXAMPLE 2

A core/sheath yarn was produced from 50 percent of the bromine-containing copolyamide of Example 1 in the core, and 50 percent of poly(ethylene terephthalate) containing 0.5 percent $TiO_2$ and 3 percent antimony trioxide in the sheath. The five filament yarn was drawn (DR = 4) at 100°C to give a yarn of 41 dtex with the following properties:

| | |
|---|---|
| Tenacity | 2.28 g/dtex |
| Extensibility | 23% |

The yarn was knitted into hoseleg panels and the panels tested for flammability as described. The flammability results obtained are given in Table 1 (see Example 5).

EXAMPLE 3

88.5 parts of 6.6/6 copolyamide (90/10 w/w), containing 2% antimony trioxide were melt blended with 13.06 parts of the hydrated hexamethylene diammonium salt of 2,7-dibromo-9,9-bis (β-carboxyethyl) fluorene as described in Example 1. The resulting polymer had the following characteristics:

| | |
|---|---|
| Relative viscosity | 32.3 |
| Amine end groups | 26.0 equiv./10⁶g |
| Carboxyl end groups | 131.5 equiv./10⁶g |
| Bromine content | 3.49% |

The polymer was melt spun at 295°C to give a 5-filament yarn which, after drawing (DR = 4.0) at room temperature, had the following properties:

| | |
|---|---|
| Yarn gauge | 47.4 dtex |
| Tenacity | 3.02 g/dtex |
| Extensibility | 47.7% |

The yarn was knitted into hoseleg panels which were tested for flammability as described. The results obtained are given in Table 1 (see Example 5).

EXAMPLE 4

6.6 nylon containing no halogen compound was melt spun as in Example 3 and the yarn produced flame-tested as a control. The results obtained as given in Table 1.

EXAMPLE 5

91.97 parts of 6.6 polyamide, containing 2 percent antimony trioxide, was melt blended with 8.03 parts of hexabromodiphenyl in the manner described in Example 1. This polymer had the following characteristics:

| | | |
|---|---|---|
| Relative viscosity | 33.1 | |
| Amine end groups | 4.2 | equiv./10⁶g |
| Carboxyl end groups | 154.0 | equiv./10⁶g |
| Bromine content | 6.4% | |

A core/sheath yarn was produced from 50 percent of the above bromine-containing polyamide in the core and 50 percent of 6.6 polyamide containing 4 percent antimony trioxide in the sheath. The 2-filament yarn after drawing (DR = 3.5) at 80°C had the following properties:

| | |
|---|---|
| Yarn gauge | 61.6 dtex |
| Tenacity | 2.62 g/dtex |
| Extensibility | 57.7% |

The yarn was knitted into hoseleg panels and the panels tested for flammability as described. The flammability results are given in Table 1 below.

The scoured test fabric had a bromine content of 2.5 percent.

TABLE 1

Fabric and filament characteristics for Examples 1-5

| Examples | Filament Characteristics | | Fabric Appearance | Fabric Bromine Content (%) | Mean Burning Time (sec) | Mean Char Length (inches) |
|---|---|---|---|---|---|---|
| | Core Polymer | Sheath Polymer | | | | |
| 1 | 90/10 6.6/6 copolyamide + 6 DBFA* (Br content 7.0%) | 6.6 polyamide + 4% Sb₂O₃ | White | 3.48 | 54.5 | 4.85 |
| 2 | do. | Polyethylene terephthalate + 3% Sb₂O₃ | White | 3.30 | 25.1 | 4.0 |
| 3 | 90/10 6.6/6 copolyamide + 2% Sb₂O₃ + 6 DBFA* (br content 3.49% Sb₂O₃:1.8%) | | Off-white | 3.40 | 41.6 | 2.75 |
| 4 | 6.6 nylon control | | White | 0 | 74.5 | 16 (Full length) |
| 5 | 66 nylon + hexabromo diphenyl (Br content 6.4% + 2% Sb₂O₃) | 66 nylon + 4% Sb₂O₃ | White | 2.50 | 37 | 7.75 |

*DBFA: Dibromo 'F' acid = 2,7-dibromo-9,9-bis (β-carboxyethyl) fluorene.

It can be seen from the above results that both the mean burning time and the charred length of fabrics made from yarns containing halogen compounds were considerably lower than the values obtained with ordinary 6.6 nylon yarn and that, of the yarns containing halogen compounds the core/sheath yarns gave fabrics with good white appearance.

EXAMPLE 6

A copolymer of ethylene: vinyl acetate (82:18) containing 20 percent decabromodiphenyl was prepared and a core/sheath yarn produced from 33 percent of the above bromine-containing copolyethylene in the core and 67 percent of 6.6 polyamide containing 4 percent antimony trioxide in the sheath. The 5-filament yarn was drawn (DR 3.0) at 100°C, knitted into hoseleg panels and the panels tested for flammability as described. The flammability results obtained are given in Table 2.

EXAMPLE 7

6.6 nylon containing no halogen compound was melt spun at 295°C to give a 5-filament yarn non-core/sheath which after drawing (DR 4.0) at room temperature was knitted into hoseleg panels and flame-tested as a control. The results are given in Table 2.

EXAMPLE 8

88.15 parts of poly(4-methyl pentene 1) and 11.85 parts of decabromodiphenyl were mixed, purged with nitrogen and heated under nitrogen, at 320°C for 25 mins, until the mixture was melted. The mixture was stirred vigorously for 15 mins to produce a homogeneous melt. It was allowed to cool with the stirrer removed from the melt.

The polymer contained 8.3 percent bromine. A sheath-core yarn was produced with 50 percent of the above bromine-containing polymer in the core and 50 percent of 6.6 polyamide containing 2 percent antimony trioxide in the sheath. The 5-filament yarn was drawn (DR = 4.0) at 90°C to give a yarn of 42.3 decitex, extensibility of 29 percent and tenacity of 2.24 g/dtex.

The yarn was knitted into hoseleg panels (16 × 4 inches) and the panels scoured to remove spinning finish. The panels were tested for flammability by the method.

The results are given in Table 2.

EXAMPLE 9

91.7 parts of 6.6 nylon containing 2 percent antimony trioxide and 8.3 parts of decabromodiphenyl were mixed, purged with nitrogen and heated in an oil bath at 285°C under a stream of nitrogen for 20 mins until the mixture was melted. The mixture was stirred vigorously for 20 minutes, to produce a homogeneous,

EXAMPLE 10

88.15 parts of Makrolon (Trade mark) (a polycarbonate supplied by Farbenfabriken Bayer AG) and 11.85 parts of decabromodiphenyl were mixed, purged with nitrogen and heated at 340°C for 35 minutes under nitrogen until the mixture was melted. The mixture was stirred vigorously for 10 minutes to produce a homogeneous, viscous melt. It was allowed to cool with the stirrer removed from the melt. The brown polymer had an inherent viscosity of 0.51, a vicat softening point of 178°C and contained 10.5 percent bromine. A sheath-core yarn was produced with 50 percent of the above bromine-containing polymer in the core and 50 percent of 6.6 polyamide containing 2 percent antimony trioxide in the sheath. The filament yarn was drawn (DR = 2.6) at 180°C to give a yarn of 49.8 decitex and 8.5 percent extensibility.

The yarn was knitted into hoseleg panels (16 × 4 inches) and the panels scoured to removed spinning finish. The panels were tested for flammability described previously.

The results are given in Table 2.

TABLE 2

Fabric, filament and flammability characteristics for Examples 6–10

| Examples | Filament Characteristics Core Polymer | Sheath Polymer | Fabric Appearance | Fabric Bromine Content (%) | Mean Burning Time (sec) | Mean Char Length (inches) |
| --- | --- | --- | --- | --- | --- | --- |
| 6 | Ethylene/vinyl acetate (82:18) copolymer + 20% decabromodiphenyl | 6.6 nylon + 4% Sb$_2$O$_3$ | Off-white | 4.94 | 38 | 1.25 |
| 7 | 6.6 nylon + 2% Sb$_2$O$_3$ control | | White | 0 | 175 | 15.75 |
| 8 | Poly(4-methyl pentene 1) + decabromdiphenyl (Br content 8.3%) | 6.6 nylon + 2% Sb$_2$O$_3$ | White | 1.69 | 43.5 | 3.62 |
| 9 | 6.6 nylon + decabromodiphenyl (Br content 8.29%) | 6.6 nylon + 2% Sb$_2$O$_3$ | Off-white | 2.49 | 32.0 | 2.66 |
| 10 | Makrolon + decabromodiphenyl | 6.6 nylon + 2% Sb$_2$O$_3$ | Off-white | 4.98 | 32.9 | 2.79 | viscous melt and allowed to cool with the stirrer removed from the melt. The cream polymer had a relative viscosity of 24.4, a vicat softening point of 266°C, CEG = 289.5 equiv/10$^6$g and contained 8.29 percent bromine.

A sheath-core yarn was produced with 50 percent of the above bromine-containing polyamide in the core and 50 percent of 6.6 polyamide containing 2 percent antimony trioxide in the sheath. The 5-filament yarn was drawn (DR = 4.0) at 60°C to give the following properties:

| | |
| --- | --- |
| Decitex | 35.4 |
| Tenacity g/dtex | 2.58 |
| Extensibility % | 19.3 |

EXAMPLE 11

Powdered poly(ethylene terephthalate) (172 parts), Sb$_2$O$_3$ (8 parts) and the diacetate of tetrabromo bis phenol A (20 parts) were intimately mixed together in a rotary blender at a speed of 2200 rpm for 3 mins. The mixture was used to spin the core of a sheath/core filament. The sheath was poly(ethylene terephthalate) containing 0.5 percent titanium dioxide as delustrant. The sheath/core ratio was 1:1.

The yarn was spun through a 20 hole spinneret (0.015 inches in diameter hole) with a throughput of 10g per minute for each component and with a wind up speed of 4,000 feet per second per minute.

The yarn was plied up to 60 filaments and drawn over a heated roll at 90°C and a hot plate at 180°C to give a drawn yarn denier of 150 and a tenacity of 3.5g per denier.

The yarn was knitted into hoselegs on a 3.5 inch circular knitting machine and tested for flammability by the method described. All samples were self-extinguishing and the average char length was 5 inches and the average burning time was 45 seconds.

EXAMPLE 12

Powdered poly(ethylene terephthalate) as used in Example 11 (174 parts), $Sb_2O_3$ (6 parts) and decabromodiphenyl (20 parts), were intimately mixed together as in Example 1 and spun as the core of a 1.1 sheath/core filament, using as sheath the polyethylene terephthalate of Example 11 and using similar conditions to Example 11 but with wind up speed 3,500 feet per minute. The yarn was drawn, knitted up into hoselegs and tested as described. The average char length was 4.5 inches and the average burning time was 41 seconds.

EXAMPLE 13

Powdered poly(ethylene terephthalate) as used in Example 11 (187 parts), $Sb_2O_3$ (3 parts) and decabromodiphenyl (10 parts) were intimately mixed together. The mixture was melt spun as homofilaments through a five hole spinneret (0.015 inch holes) at 280°C with throughput of 10.2g per minute and wind up speed 3,500 feet per minute and the spun yarn plied up to 30 filaments and drawn over a hot roll and plate as in Example 11. The drawn yarn was knitted up and tested for flammability. The average char length was 4.75 inches and the average burning time was 40 seconds.

EXAMPLE 14

Powdered poly(ethylene terephthalate) as used in Example 11 (187 parts), $Sb_2O_3$ (3 parts) and the diacetate of tetrabromo-bis phenol A (10 parts) were intimately mixed together and then spun and drawn into a homofilament yarn as in Example 13. The yarn was knitted up into a hoseleg and tested for flammability. The average char length was 5.5 inches and the average burning time was 43 seconds.

EXAMPLE 15

Powdered poly(ethylene terephthalate) as used in Example 11 (163 parts), $Sb_2O_3$ (7 parts) and decabromodiphenyl (20 parts) were intimately mixed together and the mixture used to melt spin the core of sheath/core filaments as in Example 11, using a wind up speed of 3,500 feet per minute. The sheath/core ratio was 3:2. The throughputs were 12 gm per minute for the sheaths and 8 gm per minute for the cores. The yarn was drawn and knitted up into hoselegs and tested for flammability. The average char length was 4.5 inches and the average burning time was 44 seconds.

EXAMPLE 16

Powdered poly(ethylene terephthalate) as used in Example 11 (178.4 parts), $Sb_2O_3$ (5.0 parts) and decabromodiphenyl (16.6 parts) were intimately mixed together and the mixture used for spinning the core of sheath/core filaments in Example 11, using a wind up speed of 3,500 feet per minute. The sheath/core ratio was 2:3 and the throughputs were 8 gm per minute for the sheath and 12 gm per minute for the core.

The yarn was drawn and knitted up into hoselegs which were tested for flammability. The average char length was 5.5 inches and the average burning time was 44.5 seconds.

EXAMPLE 17

Powdered poly(ethylene terephthalate) as used in Example 11 (188 parts), and decabromodiphenyl (12 parts) were intimately mixed together and used to spin the core of sheath/core filaments. The sheath was spun from a polymer mixture made up by mixing together 190 parts powdered poly(ethylene terephthalate) (as used for the core) and 10 parts antimony trioxide. The sheath/core ratio was 3:2 and the spinning throughputs were 12 gm per minute for the sheath and 8 gm per minute for the core. The wind up speed was 3,500 feet per minute.

The yarn was drawn and then knitted up into hoselegs and tested for flammability. The average char length was 5.5 inches and the average burning time was 43 seconds.

EXAMPLE 18

A yarn consisting of 5 sheath/core conjugate filaments was produced using a twin-rod spinner, with 60 percent by weight of poly(ethylene terephthalate) containing 8.0 percent of decabromodiphenyl as the core, and 40 percent by weight of 66 nylon containing 5 percent by weight of antimony trioxide as the sheath. The yarn was hot drawn at a temperature of 120°C using a draw ratio of 3.5 to 1 to give a drawn yarn with the following properties:

| | |
|---|---|
| Bromine content | 3.72% |
| Denier | 33.5 |
| Tenacity | 1.34 g per denier |
| Extensibility | 13.6% |

The drawn yarn was plied up to 40 filaments, 140 denier and knitted into hoselegs and tested for flammability. Out of six samples tested, the average char length was 7 inches and the average burning time was 52 seconds.

The conjugate filament yarn was white in appearance, whereas when an attempt was made to dissolve 23.6 percent by weight of the flame-retardant agent (decabromodiphenyl) in 6.6 nylon (containing 2 percent of antimony trioxide) by melt-blending, a brown and bubbly polymer was obtained containing 2 percent of bromine.

EXAMPLE 19

Powdered poly 1:4 butylene terephthalate (176.8 parts), $Sb_2O_3$ (5.2 parts) and decabromodiphenyl (18 parts) mixed in a tumbler mixer for 30 minutes. The mixture was used to spin the core of a sheath/core filament at 272°C. The sheath was 4GT polymer and was spun at 270°C. The sheath/core ratio was 1:2 (wt/wt).

The yarn was spun through a 20 hole spinneret (0.015 inches diam hole) at 271°C with a throughput of 11.6 g/min for the core, 5.8 g/min for the sheath and a wind up speed of 3,800 ft/min.

The yarns were plied up to provide a 60 filament yarn and drawn over a heated roll at 87°C and a hot plate at 160°C to give a drawn yarn dtex of 204 and a tenacity of 2.85 g/dtex, 2 percent modulus 25.7 g/dtex, extension 16.6 percent.

The yarn which was a good white colour was knitted into hoselegs on a 3.5 inch circular knitting machine and tested for flammability by the method described. This additive spun as a homofil gave undesirably yellowish coloured fibres. Six samples were tested and all were found to burn totally (i.e. 10 inches) giving an average burning time of 100 seconds. Six samples of a control fabric were also tested and all these burnt totally giving an average burning time of 74 seconds.

EXAMPLE 20

Powdered polyethylene terephthalate (180.5 parts) $Sb_2O_3$ (4.5 parts) pentabromotoluene (15 parts) were mixed together and spun at 280°C as the core of a 1.2 sheath/core filament. A 95 mole percent polyethylene terephthalate, 5 mole percent polyethylene adipate copolymer containing 0.05 percent $TiO_2$ as delustrant was spun at 285°C as the sheath. No fuming of the additive occurred. Both were spun as in Example 19.

The spun yarn was plied up to give an 80 filament yarn and this drawn over a hot roll at 88°C and a hot plate at 168°C. The drawn yarn properties were 192 dtex, tenacity 3.99 g/dtex, extension 15.0 percent, 2 percent modulus 85.27 g/dtex.

The drawn yarn was knitted up and six samples tested for flammability by the method described. The average char length was found to be 5½ inches and the average burning time 41 seconds.

EXAMPLE 21

Powdered polyethylene terephthalate (187 parts) $Sb_2O_3$ (3 parts) pentabromotoluene (10 parts) were mixed and kneeded for 6 hours. The mixture was melt spun as homofilaments through a 3-hole spinneret (0.015 inch holes) at 286°C with a throughput of 5.5 g/min and a wind up speed of 3,000 ft/min. Severe fuming occurred. The spun yarn was plied up to 30 fil and drawn over a hot roll at 90°C and a hot plate at 185°C. The drawn yarn was knitted up and tested for flammability. The average char length was 5½ inches and the average burning time 43 seconds.

EXAMPLE 22

| | |
|---|---|
| Decabromodiphenyl | 7.273 kg |
| $Sb_2O_3$ | 2.727 kg |
| Magnesium Stearate | 100 kg |

The above mixture was tumbled for one-half hour. 500 g paraffin wax was melted and dissolved in 840 ml of trichloroethylene, added to the above mixture and mixed. The resulting paste was left to dry overnight, sieved through 16, 32 and 72 mesh sieves and pelletised into 2/16 inch diameter pellets.

The yarn was spun as a two-thirds w/w sheath/core heterofil. The pellets were added to the granulated polymer in the screw at the rate of 28 pellets per min.

The mixture was melted and the yarn was spun at 281°–284°C through a 30 hole spinneret (0.015 inch diameter hole) with a throughput of 7.58 lb/hr and a wind up speed of 3,100 ft/min.

The spun yarn was then drawn over a hot roll at 89°C and a hot plate at 170°C.

The polyethylene terephthalate (189 parts) (containing 0.5 percent $TiO_2$ as delustrant) thus contained decabromodiphenyl (8 parts), $Sb_2O_3$ (3 parts). The drawn yarn properties were 5 percent modulus 87 g/dtex, 148 den, tenacity 4 g/dtex, extension 17.9 percent. The yarn was knitted on the Chell circular head knitting machine. Six samples were then tested for flammability by the method described, giving an average char length of 5½ inches and an average burning time of 44 seconds.

EXAMPLE 23

Powdered polyethylene terephthalate containing 0.05 percent $TiO_2$ as delustrant (174 parts), decabromodiphenyl (20 parts) and $Sb_2O_3$ (6 parts) were mixed and spun at 288°C as the core of a 1:1 sheath/core filament. Powdered polyethylene terephthalate containing 0.5 percent $TiO_2$ as delustrant was spun at 280°C as the sheath.

The yarn was spun through a 20 hole spinneret (0.015 ins diameter hole) with a throughput of 9.5 g/m for each component and with a wind up speed of 3,500 ft/min.

The spun yarn was plied up to give a 60 filament yarn and this was then drawn over a hot roll at 95°C and a hot plate at 170°C. The drawn yarn properties were 147 dtex, tenacity 3.56 g/dtex, extension 9.2 percent, 2 percent modulus 80.5 g/dtex.

The drawn yarn was knitted up on the Chell circular head knitting machine and six samples testes for flammability by the method described. The average char length was 4¾ inches and the average burning time was 41 seconds.

Visual examination of the yarn showed that the yarn was a creamy colour and more acceptable than the corresponding homofilament which gave an undesirably yellowish coloured fibre.

We claim:

1. A flame-retardant conjugate filament consisting of at least two components in a sheath/core relationship, the sheath component comprising a melt extrudable fibre-forming polymer and the core component comprising a melt extrudable fibre-forming polymer containing a reactive flame-retardant adjuvant selected from the group consisting of:
    3,6-dibromodurene
    bis(p-bromophenyl) ether
    4-bromodiphenyl
    2,7-dibromo-9,9-bis(Beta-carboxyethyl) fluorene
    2,4,6,2',4',6'-hexabromodiphenyl 2. A filament according to claim 1, wherein the sheath component is formed from a condensation polymer selected from the group consisting of polyesters and polyamides and the core component formed from a fibre-forming condensation polymer selected from the group consisting of polyamides and polyesters containing a flame-retardant reactive adjuvant.

3. A filament according to claim 1, wherein at least one of the components contains antimony trioxide.

4. A filament according to claim 1, wherein at least one of the components contains titanium dioxide.

5. A filament according to claim 3, wherein the percentage by weight of the metal oxide contained in the filament is in the range 0.5 to 5.0 percent expressed as metal.

6. A filament according to claim 1 wherein the core component contains up to 20 percent by weight of the reactive adjuvant.

7. A filament according to claim 6 wherein the cross-sectional area of the filament occupied by the core component ranges from 5 to 10 percent.

8. A flame retardant conjugate filament consisting of at least two components in a sheath/core relationship, the sheath component comprising a melt extrudable fiber-forming polymer and the core component comprising a melt extrudable fiber-forming polyester containing a flame-retardant reactive adjuvant which is a polyester derived from a dicarboxylic acid and a glycol, said reactive adjuvant polyester selected from the group consisting of poly(ethylene-2,7-dibromofluorene-9,9-dipropionate) and poly(hexamethylene-2,5-dibromoterephthalate).

* * * * *